Jan. 12, 1960 V. E. TICE 2,921,259
FEED RATE INDICATOR FOR MACHINE TOOLS
Filed April 9, 1956 4 Sheets-Sheet 1
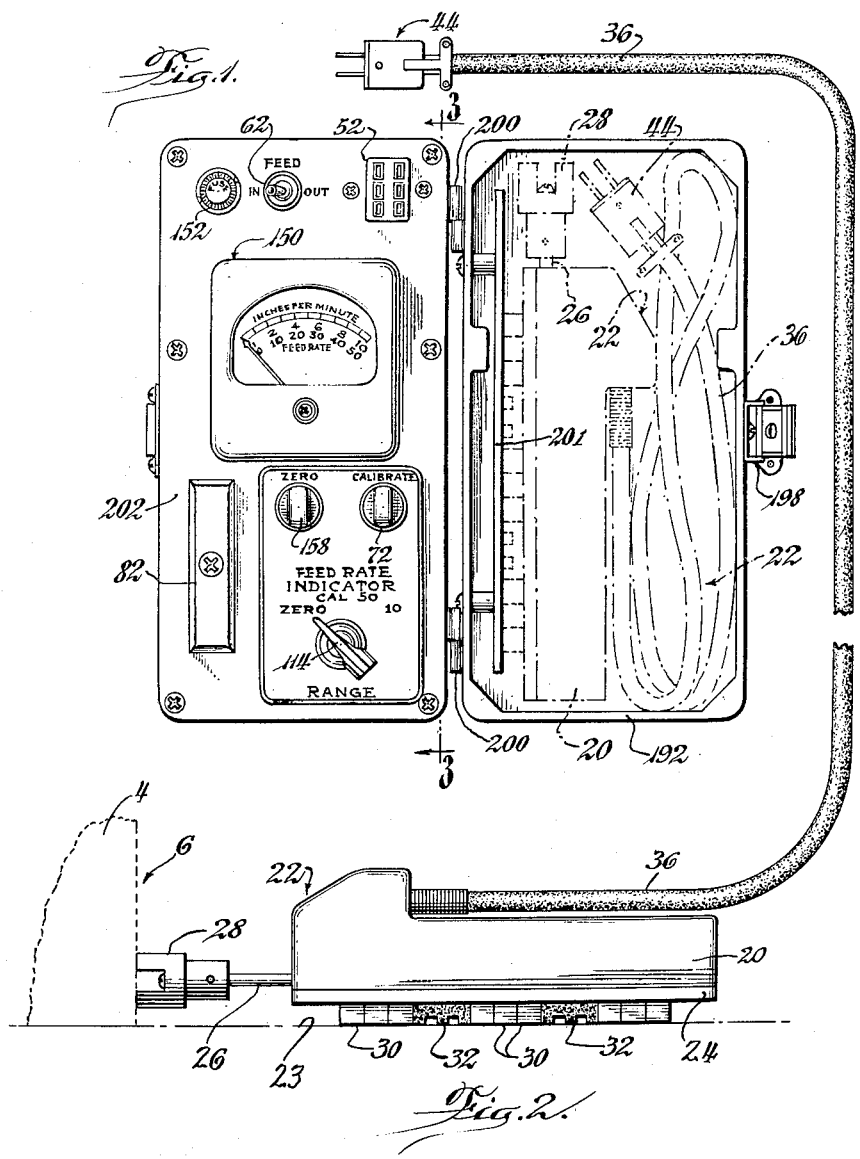
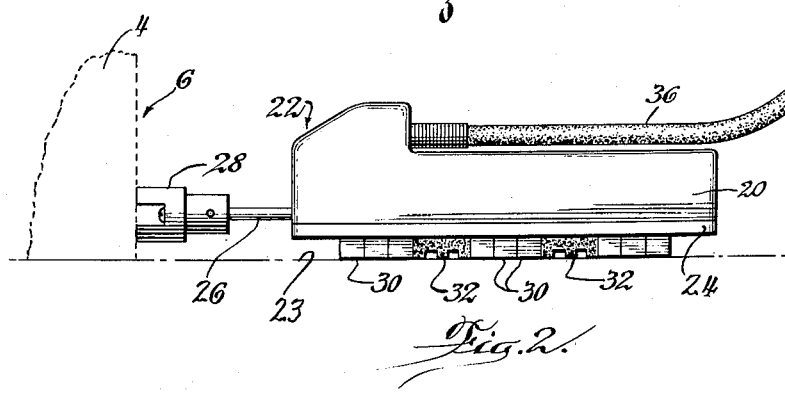
INVENTOR.
Virgil E. Tice
By Ahlberg, Huipper and Gradolph
Attorneys

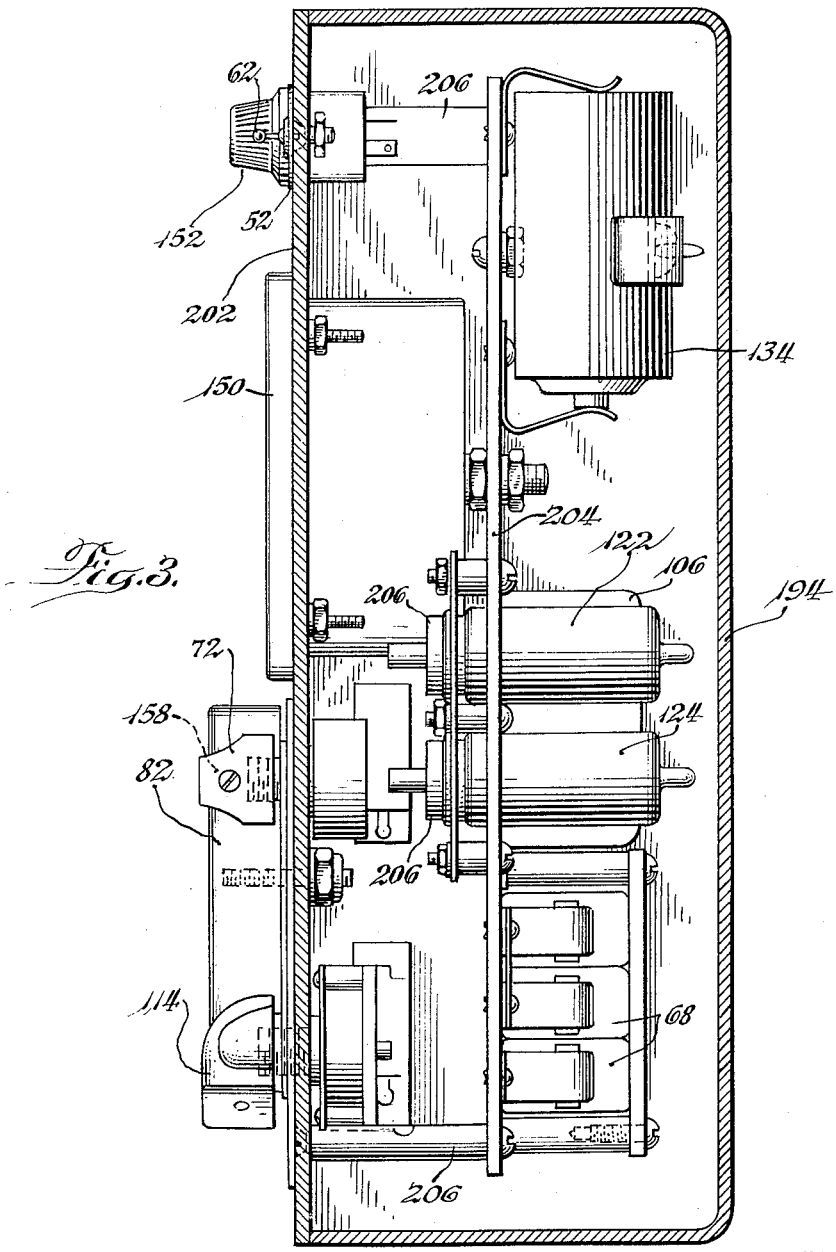

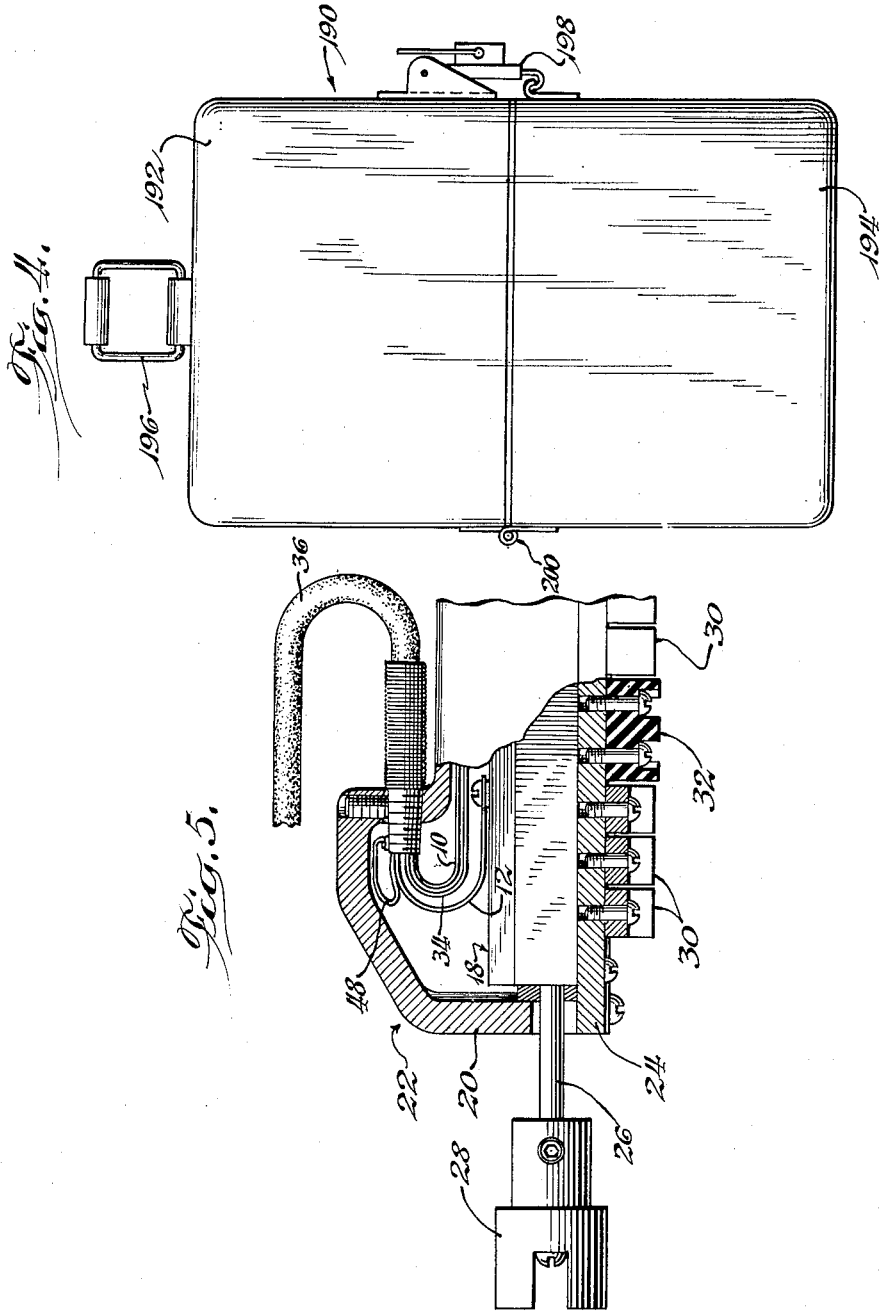

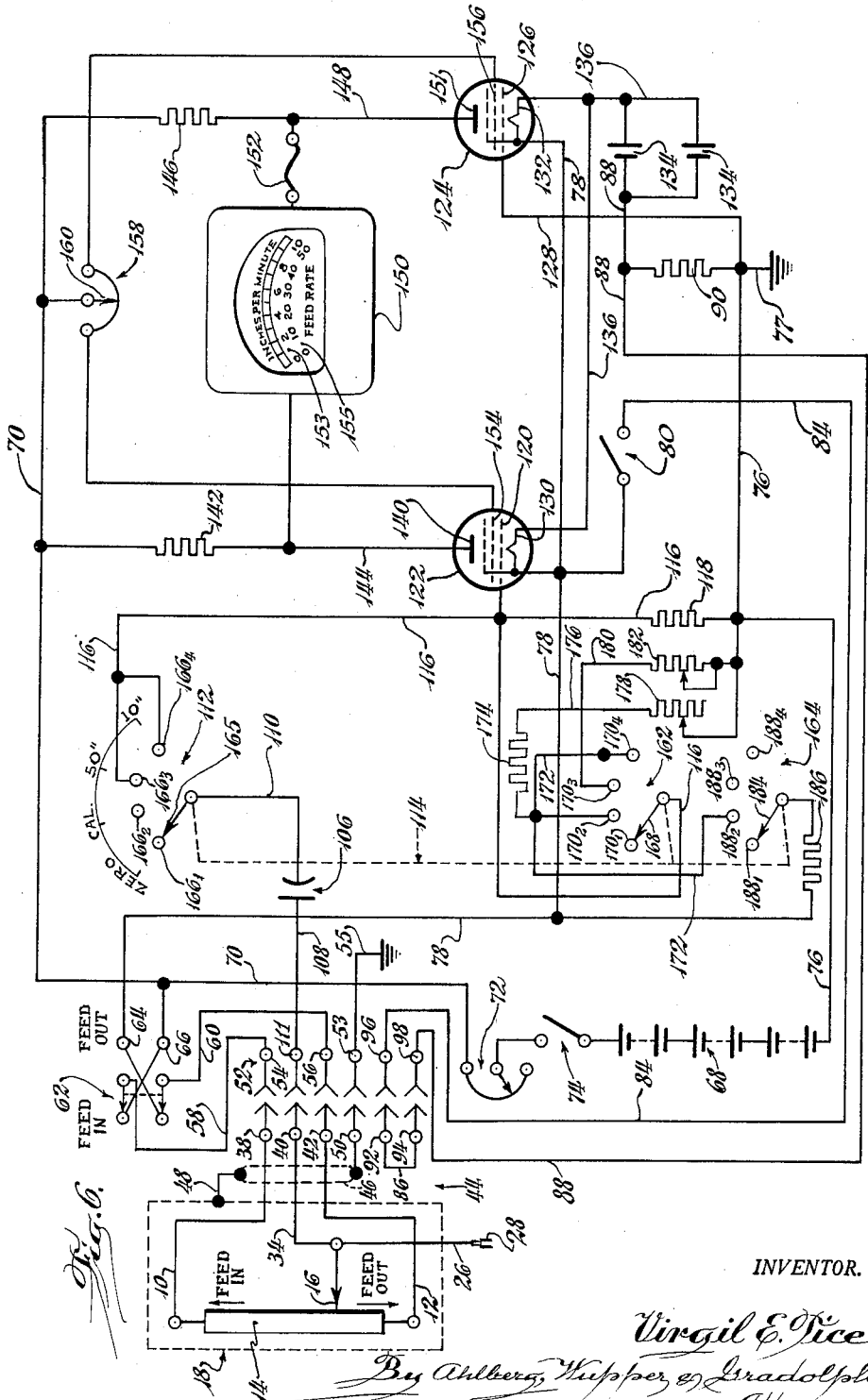

United States Patent Office 2,921,259
Patented Jan. 12, 1960

2,921,259

FEED RATE INDICATOR FOR MACHINE TOOLS

Virgil E. Tice, Richmond, Ind., assignor to National Automatic Tool Company, Inc., Richmond, Ind., a corporation of Indiana Application April 9, 1956, Serial No. 577,148

13 Claims. (Cl. 324—70)

The present invention relates to apparatus for indicating the instantaneous speed or rate at which a machine tool effects relative traversing movement between a cutting tool and a workpiece. For convenience, the speed of this relative traversing movement will be referred to as the "feeding rate" of the machine tool.

The general aim of the invention is to provide for convenient use in the machine shop a portable speed indicator of improved construction which is capable of accurately determining the instantaneous feeding rates of different machine tools. The problem of measuring accurately the feeding rates of different machine tools is complicated not only by the wide ranges of machine tool feeding speeds but also by the very low values of some feeding speeds, which inherently are extremely difficult to determine instantaneously with exactness.

In many respects electronic speed indicating apparatus is most feasible for this purpose. However, the accuracy of electronic speed indicating apparatus can be affected adversely by changes in the effective values of components due to aging, changes in ambient temperature, and other factors difficult to control.

One object of the invention is to provide improved electrical speed indicating apparatus which is capable of indicating the instantaneous feeding rate of a machine tool over a wide speed range with exacting accuracy for even the slowest feeding speeds. A related object is to provide machine tool feed rate indicating apparatus of this character which has an extreme accuracy in operation that is dependable over a long service life of the apparatus and substantially immune to changes in ambient temperature and other environmental conditions.

Another object is to maximize the convenience, utility, and serviceability of machine tool feed rate indicating apparatus of the character recited in the previous objects by means of a unique construction of the apparatus as a portable hand instrument having remarkably small size and weight.

A related object is to provide a feed rate instrument as recited above which inherently affords a high order of protection against improper calibration and use of the instrument.

Other objects and advantages will become apparent from the following description of the exemplary form of the invention illustrated in the drawings, in which:

Figure 1 is a plan view showing the open position of a feed rate indicator embodying the invention, the pickup unit of the indicator being illustrated in phantom in the position in which it is normally stowed in the hinged cover for the indicator;

Fig. 2 is an elevational view showing the pickup unit of the indicator positioned on machine tool ways, illustrated schematically in phantom;

Fig. 3 is a longitudinal sectional view on an enlarged scale taken along the line 3—3 of Fig. 1 and showing the internal arrangement of structural components, except for connecting wires which have been eliminated for clearness in illustration;

Fig. 4 is an end view showing the indicator in closed position;

Fig. 5 is a fragmentary side view of the pickup unit partially broken away to reveal its construction; and Fig. 6 is a diagrammatic illustration showing the electrical system of the indicator.

The present application is a continuation-in-part of my copending application Serial No. 437,388, filed June 17, 1954.

As shown in the drawings, the present invention is embodied in an exceptionally compact, lightweight hand instrument that is extremely convenient to use and service. Structural features of the instrument that maximize operational ease and convenience will be described presently in relation to electrical aspects of the invention, which can be visualized most readily with reference to the diagrammatic illustration in Fig. 6 of the electrical circuits used.

Translation of a slide 4 or other component part of a machine tool 6 (only partially illustrated schematically in phantom in Fig. 2) that moves at a speed corresponding to the feeding rate of the machine tool, is sensed initially as a change in a voltage varied as an accurate linear function of the changing position of the machine tool component.

For this purpose, two conductor wires 10 and 12 (illustrated at the left end of Fig. 6) leading from opposite poles of a voltage source—to be described presently—are connected to opposite ends of an elongated resistor 14. The resistor 14 has a uniform resistance along its entire effective length. Thus, the application of a constant potential across the resistor 14 from opposite ends produces a uniform voltage gradient along the resistor. The resistor 14 is engaged by a sliding contact 16 which is translated along the resistor in response to changes in the position of a movable machine tool component.

The resistor 14 and sliding contact 16 work together in an elongated potentiometer assembly 18, Fig. 6, mounted within an elongated casing 20 of a pickup unit 22, Figs. 2 and 5. Protected by suitable insulation, the potentiometer assembly 18 is supported on a detachable bottom plate 24 forming a part of the casing 20. An operating plunger 26 for the contact 16 projects from the potentiometer assembly through one end of the casing 20. The projecting end of the plunger 26 supports a permanent horseshoe magnet 28 adapted to adhere magnetically to a machine tool slide or the like.

To firmly yet removably anchor the pickup unit 22 to machine tool ways 23, Fig. 2, a series of permanent, horseshoe magnets 30 are fixed to the underside of the pickup casing plate 24, Figs. 2 and 5. Strong frictional resistance to sliding movement of the magnets 30 along machine tool ways 23 or the like is produced by strong magnetic adherence of the magnets to the magnetic structure of the ways.

This magnetically induced frictional resistance to sliding of the casing 20 is multiplied by friction pads 32 attached to the plate 24 between various ones of the magnets 30 as shown in Figs. 2 and 5. Formed from a firm yet resilient material having a high coefficient of friction, the friction pads 32 are dimensioned to extend, when uncompressed, somewhat beyond the pole faces of the magnets 30. Thus when the magnets 30 are pulled magnetically into engagement with a magnetic member the friction pads 32 are compressed against the member to produce a powerful frictional resistance to sliding of the pickup casing 20—which is cumulative with the previously mentioned frictional resistance to movement of the magnets on the magnetic member.

As will presently appear, the feed rate indicating instrument provided by the invention will operate effectively in response either to progressive retraction of the plunger 26 into the pickup unit casing 20 or progressive extension of the plunger from the casing.

Thus the matter of application of the pickup unit 22 to a machine tool to sense the movement of a slide along support ways is an extremely simple matter. Oriented with the plunger 26 parallel to the line of movement of the slide 4, Fig. 2, the pickup unit 22 normally is placed on the machine tool ways 23 either immediately behind the slide or a short distance ahead of the slide, depending upon which position is the more convenient. Upon being moved into proximity to the slide 4, the magnet 28 abuttingly engages and magnetically adheres to the slide to cause the plunger 26 and hence the movable contact 16 to follow translatory movement of the slide either toward or away from the pickup casing 20.

The two voltage supply wires 10 and 12 and a third wire 34 connected to the sliding contact 16, Figures 5 and 6, extend through a flexible cable 36 to three terminals 38, 40 and 42 of a six prong Jones plug 44, Figs. 2 and 6. An electric shield 46 forming part of the cable 36 and indicated diagrammatically in Fig. 6 is grounded at 48, Fig. 5, to the pickup casing 20 and connected at the opposite end to a fourth terminal 50 of the Jones plug 44.

In use the Jones plug 44 is inserted into a six terminal socket 52, Figs. 1 and 6. The socket terminal 53 corresponding to the plug terminal 50 is grounded at 55 to the socket support thus forming a connection between the latter and the pickup casing 20.

Two terminals 54 and 56 of the socket 52, which connect through the socket with the plug terminals 38 and 42, respectively, are connected through two conductors 58, 60 with the output terminals of a reversing switch 62 that is used to reverse the polarity of the voltage applied to the resistor 14.

The input terminals 64 and 66 of the reversing switch 62 are interconnected with a voltage source 68 formed by a series of "B" batteries (also denoted by the numeral 68). The switch input terminal 66 is connected to the positive pole of the voltage source 68 by a conductor 70, a calibrating rheostat 72 and a normally open switch 74.

The negative pole of the voltage source 68 is connected to a conductor 76 grounded at 77 to the instrument. The other input terminal 64 of the reversing switch 62 is connected to the grounded conductor 76 by a conductor 78, a normally open switch 80 (which, as will presently appear, is paired with the switch 74 for operation by a common switch control bar 82, Figs. 1 and 3) a conductor 84, a jumper 86, a conductor 88 and a resistor 90 also grounded at 77. As will presently appear, the conductors 84 and 88, as well as the switch 80 and jumper 86 also constitute a part of a power supply circuit for heating the filaments of paired vacuum tubes used in the instrument. The connecting jumper 86 provides assurance the conductors 84 and 88 are disconnected when the instrument is not in use. For this purpose the jumper 86 is connected between the two remaining terminals 92, 94 of the Jones plug 44 to form upon insertion of the plug into the socket 52 a connection between two socket terminals 96, 98 connected to the respective conductors 84 and 88.

As indicated by the legends and arrows in Figs. 1 and 6, the reversing switch 62 is set to correlate the polarization of the resistor 14 with the direction of movement of the pickup unit plunger 26 so that the contact 16 is moved toward the positive end of the resistor.

Since the voltage gradient along the resistor 14 is uniform over the entire effective length of the resistor, the potential of the sliding contact 16 relative to the negative end of the resistor is a direct linear function of the position of the contact along the resistor. Conversely, the rate of change of the potential of the contact 16 relative to the negative end of the resistor 14 is a direct linear function of the speed of movement of the contact along the resistor.

The instantaneous speed of the contact 16 is determined with exacting accuracy, even though this speed may be extremely low, by means which responds with great accuracy and dependability to the changing potential of the contact 16 in such a manner that the linearity of the relationship between the potential of the contact 16 and the position of the contact along the resistor 14 is not disturbed. More particularly, the speed of movement of the contact 16, as reflected by the changing potential of the contact, is measured instantaneously by extremely accurate and dependable electronic means, which responds with extreme sensitivity to the total charging current to a capacitor 106, Fig. 6, subjected to the potential of the contact 16 relative to the negative end of the resistor 14. Hence, the effective capacitance of the capacitor 106 can be minimized to reduce the current flow to the capacitor to an extremely low value, which does not disturb the linearity of the voltage gradient along the resistor 14.

Moreover, since the required capacitance of the capacitor 106 is not great—and, hence, of only secondary importance—the capacitor can be formed of a construction that provides capacitance of an extremely stable value, while at the same time holding the cost and size of the capacitor within highly practical limits.

One side of the capacitor 106 is connected to the sliding contact 16 by means of a conductor 108 extending to a terminal 111 on the socket 52, which connects through the Jones plug terminal 40 with the contact. The other side of the capacitor 106 is connected to the negative end of the resistor 14 through one section 112 of a three section selector switch 114, a conductor 116, a high value resistor 118, and the conductor 76 which connects with the negative end of the resistor 14 in the manner previously described.

Thus assuming that the conductor 110 is connected through the switch stage 112 to the conductor 116, it is evident that under steady state conditions the voltage applied across the capacitor 106 is constant and substantially equal to the potential of the contact 16 relative to the negative end of the resistor 14. Upon movement of the contact 16 toward the positive end of the resistor 14 current immediately flows from the conductor 76 through the conductor 116 to increase the charge of the capacitor 106 for maintaining the voltage across the capacitor at the potential of the contact 16 relative to the negative end of the resistor.

The flow of capacitor charging current from the conductor 76 to the conductor 116 produces a voltage drop across the resistor 118 which is proportional to the rate of current flow, which, in turn, is proportional to the rate of change of potential of the contact 16 as applied to the capacitor 106. It is noteworthy in this connection that time lag between a change in potential of the contact 16 and the accompanying change in the voltage across the capacitor 106 is so infinitesimally small that it is of no consequence.

The instrument provided by the invention is made to respond dependably with exacting accuracy to the voltage drop across the resistor 118 to provide an accurate measure of the instantaneous speed of the contact 16.

For this purpose the voltage of the conductor 116 is applied directly to the control grid 120 of a pentode 122 operated in parallel with an identical pentode 124. The control grid 126 of the tube 124 is connected by a conductor 128 to the conductor 76.

Directly heated cathodes 130, 132 of the respective tubes 122, 124 are connected in parallel between opposite poles of a power source formed by two parallel "A" batteries 134.

The positive terminals of both batteries 134 are connected through a conductor 136 to one side of both tube filaments 130, 132. The native terminals of both batteries 134 are connected to the conductor 88. As previously described, the conductor 88 forms a part of a circuit extending through the jumper 86 and switch 80 to the conductor 78, which is connected, as shown, to the side of each tube filament 130, 132 opposite the conductor 136.

Thus, the circuit from the batteries 134 through the vacuum tube filaments 130, 132 cannot be completed through the jumper 86 unless the Jones plug 44 is properly inserted into its coacting socket 52. With the connection made through the jumper 86, the tube filament circuit is completed upon closure of the switch 80, operated simultaneously with the switch 74.

The anode or plate 140 of the tube 122 is connected through a conductor 144 and a resistor 142 to the conductor 70 leading from the positive terminal of the voltage supply 68. Similarly, the plate 151 of the tube 124 is connected to the conductor 70 by a conductor 148 and a resistor 146 identical to the resistor 142. Thus, the tube 122 and the resistor 142 in series with the tube form primary and secondary impedances in a first circuit path between the grounded conductor or pole 136 and the conductor or pole 70, which is biased relative to pole 136. In like manner, the tube 124 and the resistor 146 form primary and secondary impedances in a second circuit path connecting thte two poles 136 and 70.

The conductors 144 and 148 from the plates of the respective tubes 122 and 124 are connected by a sensitive microammeter 150 protected by a series fuse 152. The meter 150 is graduated to indicate the speed of the contact 16 directly on either a low range scale 153 (graduated from zero to ten inches per minute) or a high range scale 155 (graduated from zero to fifty inches per minute) coextensive with the low range scale.

The suppressor grids of the pentodes 122 and 124 are connected directly to the cathodes of the respective tubes.

For calibrating or balancing the tubes 122, 124 relative to each other, the screen grids 154 and 156 of the respective tubes 122, 124 are connected to the two resistor terminals of a potentiometer 158. The adjustable resistor engaging contact 160 of the potentiometer 158 is connected to the conductor 70. Operative to vary the relative voltages applied to the screen grids of the two tubes 122, 124, the potentiometer 158 is adjusted to effect a zero calibration or reading of the instrument.

Presetting of the instrument for either zero or full scale calibration is effected by means of the triple section switch 114, which is also used to set the instrument to indicate feeding rates on either the high range scale 155 or the low range scale 153.

The selector switch 114 has four different positions—a zero calibrating position, a full scale calibrating position, a high scale indicating position, and a low scale indicating position. These four positions are indicated by simplified legends in Figs. 1 and 6 in which the zero calibrating position is designated by the word "Zero"; the full scale calibration position, by the abbreviation "Cal."; the high range indicating position, by the number 50; and the low range position, by the number 10.

The switch 114 has three sections, the previously mentioned section 112 and two similar sections 162 and 164. Each switch section comprises a movable contact shiftable into engagement with any one of four terminals designated by subscripts 1 to 4 and corresponding respectively, with the zero calibrate, full scale calibrate, high range scale, and low range scale positions of the switch. Some of the terminals of each switch section are not used in making connections through the switch and will not be described specifically in relation to the circuitry.

The switch section 112 has a movable contact 165 connected to the conductor 110 and only two effective terminals $166_3$ and $166_4$, both connected to the conductor 116.

The switch section 162 comprises a movable contact 168 connected to the conductor 116 and three effective terminals $170_2$, $170_3$ and $170_4$. The terminals $170_2$ and $170_4$ are both connected by a conductor 172 to one end of a resistor 174. The other end of the resistor 174 is connected through a conductor 176 and an adjustable trim resistor 178 to the conductor 76 leading from the negative pole of the voltage supply 68. The terminal $170_3$ of the switch section 162 is connected to the conductor 76 by a conductor 180 and an adjustable resistor 182.

The switch section 164 comprises a movable contact 184 connected to the conductor 78 through a full scale calibrating resistor 186. The function of this calibrating resistor will become clear as the description proceeds. A single effective terminal $188_2$ of the switch section 164 is connected to the conductor 172.

The three contacts 165, 168, and 184 of the switch 114 are operated simultaneously by a single operator (also designated by the numeral 114).

It is evident upon inspection of Fig. 6 that the selector switch 114 provides a highly simplified control of the various circuits through which voltage is applied to the conductor 116 and, hence, to the control grid 120 of the tube 122. Turning of the switch 114 to its zero calibrating position breaks the circuits through all three switch sections 112, 162 and 164. Thus, the electrical connection through conducting structure of the conductor 116 to the remaining circuitry is limited to a single circuit path through the resistor 118. This is the desired condition for balancing the output of the tubes 122 and 124 by means of the potentiometer 158.

For convenience, the normal operating sequence of the switch 114 will be varied in the description here.

Upon turning of the switch 114 to its low range indicating position, the conductor 116 is connected through the switch section 112 with the capacitor 106 and through the switch section 162 to the resistor 174. The circuit path between the conductor 116 and conductor 76 thus completed through the resistors 174 and 178 is parallel to the circuit path through the resitsor 118. The overall resistance to the flow of current through these two parallel circuit paths between the conductors 76 and 116 is such that the change in voltage on the tube grid 120, incident to the flow of charging current into the capacitor 106 produces accurate readings of the speed of the contact 16 on the low range scale 153 of the meter 150.

Similarly, shifting of the selector switch 114 to its high range scale position connects the conductor 116 through the switch section 112 to the capacitor 106 and through the switch section 162 to the resistor 182, which forms a circuit path between the conductor 116 and the conductor 76 parallel to the resistor 118. The effective resistance of these two parallel circuit paths is such that the speed of the contact 16 is indicated on the high scale range scale 155 of the meter 150.

The circuit connections made upon turning of the selector switch 114 to full scale calibrating position can be regarded as modifications of the circuit connections used to indicate feeding speeds on the low range scale 153. The first modification is the disconnection of the conductor 116 from the capacitor 106 by the switch section 112. A second modification is the connection of the calibrating resistor 186 through the switch section 164 to the conductor 172, which is connected through the switch section 162 to the conductor 116.

The effective value of the full scale calibrating resistor 186 is such that the flow of current through the resistor 186 to the conductor 116 is exactly the same as the current flow which would occur under similar conditions between the capacitor 106 and the conductor 116 if the selector switch 114 were set at its low range indicating position and the sliding contact 16 moved at the maximum speed (in this instance, ten inches per minute) to which the low range scale 153 is graduated.

With the selector switch 114 turned to full scale calibrating position, the switches 74 and 80 are closed simultaneously and the calibrating resistor 72, in series with the voltage source 68, adjusted as necessary to effect a full scale meter reading on the low range scale 153.

The feed rate indicator embodying the invention forms an extremely compact lightweight hand instrument which affords a maximum of convenience and operating ease to the user while at the same time providing worth-while protection against inadvertent errors in operating the instrument.

As shown in Figs. 1 and 4, the entire instrument including the pickup unit 22 is normally contained within a rectilinear casing 190 formed in two half sections 192 and 194. Surmounted by a convenient carrying handle 196, the upper casing section 192 forms both a cover for the lower setcion 194, Fig. 4, and a receiver for stowing the pickup unit 22, Fig. 1.

The two casing sections 192 and 194 are separably connected by a link lock 198, Fig. 4, on one side of the casing and hinges 200 on the other side of the casing. Coacting hinge elements attached to the respective casing sections are slidably separable to permit complete removal of the section 192 from the lower section 194.

The pickup unit 22 is detachably supported in the upper casing section 192 by the adherence of the magnets 30 and friction pads 32 to a flat elongated plate 201 of magnetic material mounted on one longitudinal side wall of the casing section, Fig. 1. The cord 36 fits into the casing section 192 around the body of the pickup unit 22.

The electrical components of the instrument which coact with the pickup unit 22 are all accessibly mounted on and substantially within the lower casing section 194, which is sufficiently small to be conveniently grasped and supported in one hand of the user.

Formed as an upwardly open casting of generally rectangular shape, the casing section 194 is covered by a substantially flat instrument panel 202. An auxiliary component support panel 204, parallel to the instrument panel 202, is supported centrally within the casing section 194 by four studs 206 on panel 202. See Fig. 3.

As shown in Fig. 3, the voltage supply batteries 68, the tube filament heating batteries 134, and the capacitor 106 are attached to the underside (the right hand side as shown in Fig. 3) of the plate 204. The two tubes 122 and 124 extend down through the panel 204 from tube bases 206 yieldably mounted on the upper side of the panel 204.

The graduated meter 150 is mounted centrally in the instrument panel 202. See Figs. 1 and 3. The selector switch 114, the zero calibrating potentiometer 158, and the full scale calibrating rheostat 72 are mounted in one end of the instrument panel 202, Fig. 1, in a closely spaced group which facilitates calibration and use of the instrument. The energizing switch actuator 82, designed for operation by manually applied pressure, is mounted on the panel 202 immediately to the left of the selector switch 114 and the potentiometer 158. Thus positioned, the actuator 82 can be operated conveniently by the thumb of the user's left hand, which is used to grasp and support the instrument from the left hand side—with reference to Fig. 1. This leaves the user's right hand free to operate other controls on the instrument.

The opposite end of the panel 202 accessibly supports the fuse 152, the reversing switch 62 (marked with suitable legends as shown in Fig. 1), and the Jones socket 52.

The four surface areas formed by the upper and lower faces of the two panels 202 and 204 provide ample room for mounting the electrical components of the instrument without crowding. Yet, upon attachment of the panel 204 to the studs 206 on the panel 202, the instrument components form a highly compact assembly in which components on one panel fit into interstices between components on the other panel.

Moreover, all of the components of this compact assembly are conveniently accessible for servicing. The entire assembly can be removed as a unit from the casing section 194 by detaching and removing the instrument panel 202 which supports the assembly. Detachment of the panel 204 from the suspension studs 206 opens up all four face surfaces of both panels 202 and 204 for convenient access to every component.

The simple procedure used in operating the portable machine tool feed rate indicating instrument thus provided usually starts with the instrument completely contained within the closed case 190, Fig. 4. The instrument is carried to a machine tool where the case 190 is opened and the pickup unit 22 lifted slidably from the support bar 201, Fig. 1. If desired, the cover 192 is detached from the lower section 194 of the case.

The Jones plug 44 is inserted in the socket 52 and the instrument fully calibrated just prior to use. To calibrate, the selector switch 114 is turned to zero position, the switch bar 82 is pressed down, and the zero calibrating potentiometer 158 adjusted, if necessary, to effect an exact zero reading on the meter scale 153 and 155. As previously explained, this adjustment controls the relative potential on the tube screen grids 154 and 156 to balance the output of the tubes 122 and 124. The selector switch 114 is then turned to the full scale calibrating position and the switch actuator 82 again pressed. If necessary, the full scale calibrating rheostat 72 is adjusted until a full scale reading is indicated on the low range meter scale 153.

The previously described use in the Jones plug 44 of the jumper 86, which forms a necessary component of the tube filament heating circuit, assures that the plug 44 is properly inserted into the socket 52 when the instrument is calibrated. This safety feature prevents inadvertent calibration of the instrument without including in the overall instrument circuits the resistor 14, which forms a drain on the batteries 68.

Either before or after calibration of the instrument, which requires only a few seconds, the pickup unit 22 is placed on the machine tool for coaction with a slide or other suitable part in the manner previously described. With the reversing switch 62 set in its proper position, the selector switch 114 is turned to its high range position—if there is any possibility that the speed of the machine tool part actuating the pickup unit is in excess of the maximum that can be indicated on the low range meter scale 153. An indication of the feeding rate of the machine tool is obtained simply by pressing the switch bar 82. The tubes 122, 124 warm up immediately to provide an accurate reading of the feeding rate on the meter 150.

If the feeding rate falls within the range covered by the low range meter scale 153, the selector switch 114 is shifted to the low range position. The switch bar 82 is again passed to indicate the feeding rate on the low range scale 153.

While the selector switch 114 is turned manually from one position to another, the normal sequence of operation of the switch 114 is (in a sense) built into the instrument. Thus, to make the proper switch settings for using the instrument, the operator starts by turning the switch control 114 counterclockwise (with reference to Fig. 1) to one extreme position. Successive settings are made correctly by indexing the switch always in the same direction (clockwise) to the next switch position until the extremely simple operating procedure is completed.

Thus, the instrument provides highly accurate indications of instantaneous machine tool feeding rates varying from extremely slow rates up to fifty inches per minute. Although this overall range is more than adequate to meet the requirements of most users, it will be appreciated that the instrument can be readily adapted to indicate feeding speeds over greater speed ranges simply by changing the effective values of electrical components of the instrument.

As previously explained, the capacitor 106 need not have great capacitance. Hence it may be designed primarily to provide great stability in the effective value of its capacitance. This fact, together with the zero and full scale calibrations of the instrument immediately before it is used assures accuracy and dependability over a long service life.

After use the Jones plug 44 is removed and the unit 22 stowed in the cover 192, which is placed back on the lower casing section 194.

I claim:

1. A sensitive indicator for indicating the instantaneous speed of a machine tool element, comprising, in combination, an elongated resistor, a movable contact engaging said resistor intermediate the ends thereof, means providing two direct current power supply poles of opposite polarity, means connecting opposite ends of said resistor to said respective power supply poles independently of said contact, actuating means connected to said contact and adapted for movement by a machine tool element to move the contact along the resistor, a capacitor, a second resistor, means for connecting said second resistor and said capacitor in series between said movable contact and one end of said first mentioned resistor, and voltage sensitive indicator means connected between opposite ends of said second resistor to be electrically in parallel with said second resistor and indicate in terms of speed the voltage drop across said second resistor produced by flow of capacitor current therethrough incident to movement of the said contact along said first mentioned resistor.

2. A sensitive machine tool feed rate indicator comprising in combination, resistor means having two ends and substantial effective length therebetween, a movable contact engaging said resistor means between said ends thereof, means for moving said contact along said resistor means in response to movement of a machine tool element the speed of which is to be determined, direct current power supply means providing two poles of opposite polarity, means for connecting said poles to said respective ends of said resistor means, said resistor means having a uniform resistance therealong, a second resistor connected to one of said power supply poles, a capacitor, means for connecting said capacitor between said contact and said second resistor whereby movement of the contact along said resistor means causes a flow of capacitor current through said second resistor creating a differential voltage thereacross, means for disconnecting said second resistor from said capacitor, means including a calibrating resistor connectable between the other of said poles and the capacitor end of said second resistor to provide a differential voltage thereacross simulating the differential voltage produced across the second resistor by a capacitor current flowing therethrough during normal operation of the indicator when said contact is moving at a predetermined speed along said resistor means, means providing two parallel circuit paths, means for applying a voltage across both circuit paths simultaneously, each circuit path including a secondary impedance and a primary impedance formed by a vacuum tube having a plurality of grids therein, a sensitive electric meter connected between the secondary impedance sides of the two tubes and graduated to indicate current flow through the meter in terms of machine tool feeding speed, means for applying a calibrating voltage to a control grid in each of said tubes, means for regulating with respect to each other the calibrating voltages applied to the grids of the two tubes to effect a zero reading on said meter, means connecting opposite ends of said second resistor to two grids in said respective tubes, and voltage adjusting means connected in series with said direct current power supply means.

3. A sensitive machine tool indicator comprising, in combination, a pickup unit including resistor means having two ends and substantial length therebetween, means for detachably securing said resistor means to a machine tool component, a movable contact in engagement with said resistor means, actuating means coacting with said contact to move the latter along said resistor means between said ends thereof in response to movement of a machine tool element, a multiterminal connector, and a flexible cord connecting said respective ends of said resistor means and said movable contact to three individual terminals of said connector; and a hand unit including a casing adapted to be held in one hand, a multiterminal connector adapted to connect separably with said pickup unit connector, direct current power supply means providing two poles of opposite polarity, means for connecting said poles to two terminals on said hand unit connector which coact with terminals on said pickup connector that are connected to opposite ends of said resistor means, a capacitor, means connecting one side of said capacitor to a terminal of said hand unit connector which coacts with the terminal on said pickup unit connector which is connected through said cable to said contact, a second resistor, means for connecting said second resistor between said capacitor and one of said poles, means for disconnecting said capacitor from the capacitor end of said second resistor, a calibrating resistor connected to the other of said poles, means for selectively connecting said calibrating resistor to the capacitor end of said second resistor, an electronic amplifier including a vacuum tube having a tube heating element therein, a heating circuit connected to said vacuum tube heating element and including a power supply, said tube heating circuit having opposite ends connected to two terminals on said hand unit connector, said pickup unit connector having two terminals connected by a jumper and disposed for coaction with said two last mentioned hand unit terminals, means connecting opposite ends of said second resistor to said amplifier to control the latter in accordance with the voltage across said second resistor, and sensitive meter means connected to the output side of said amplifier and graduated to respond to the output of said amplifier in terms of feeding speed.

4. A sensitive machine tool feed rate indicator comprising, in combination, an upwardly open casing section shaped and dimensioned to be grasped and supported in one hand of a user, an instrument panel detachably secured to said casing section in covering relation thereto, a component support panel detachably suspended from said instrument panel in spaced parallel relation thereto for disposition thereby within said casing section, a multiterminal electrical connector mounted in said instrument panel, means including a battery mount on said component support panel defining two power supply poles, means connecting said power supply poles to two terminals on said connector, a capacitor mounted on one of said panels and connected to a third terminal of said connector, a resistor connected at one end to one of said power supply poles, a selector switch mounted on said instrument panel for convenient operation; said selector switch having a zero calibrating position, a full scale calibrating position, and an indicating position; coacting contacts on said selector switch connected respectively to said capacitor and to said resistor and positioned relative to each other to connect said capacitor and said resistor in series when said switch is in indicating position and to break the connection between said capacitor and said resistor when said switch is in either calibrating position, a calibrating resistor connected to the other of said poles, said selector switch having coacting contacts connected respectively to said calibrating resistor and to the capacitor end of said first mentioned resistor to connect the two in series only when said selector switch is in full scale calibrating position, a full scale calibrating rheostat accessibly mounted on said instrument panel and connected in series with one of said two poles to adjust the effective battery potential thereon, a switch actuator accessibly mounted on said instrument panel, a first switch mounted on said instrument panel for control by said switch actuator and connected in series with one of said two poles to control energization thereof, means supported from said instrument panel defining two parallel circuits extending between said two poles, each of said circuits including a primary impedance and a secondary impedance in series, each of said primary impedances being formed by a multigrid vacuum tube including an electrical heating element, tube heating element battery supports mounted on said support panel, circuit means connecting said tube heating elements and extending to said battery supports and to two terminals of said connector, a second switch interposed electrically in said heating element circuit and mounted on said instrument panel for control by said switch actuator thereon, a sensitive meter mounted in said instrument panel and graduated to indicate machine tool feeding speeds, means connecting said meter between the secondary impedance sides of the two tubes, a zero calibrating potentiometer accessibly mounted on said instrument panel and connected between one of said poles and a grid in each of said tubes, said potentiometer being adjustable to vary relative to each other the voltages applied to the grids of the two tubes to obtain a zero reading on said meter, means connecting opposite ends of said first mentioned resistor to two grids of said respective tubes, a multiterminal pickup connector capable of connecting separably with said hand unit connector, said pickup connector having two terminals connected by a jumper and disposed for connection with the two tube heating terminals of said hand unit connector, resistor means having two ends and substantial effective length therebetween, a movable contact engaging said resistor means, actuating means coacting with said contact to move the latter along said resistor means in response to movement of a machine tool element, said resistor means being formed to have a uniform resistance along the effective length thereof, a flexible conductor connecting said contact to a terminal of said pickup connector which connects with the capacitor terminal of said hand unit connector, and flexible conductors connecting said ends of said resistor means to two terminals on said pickup connector which connect with the two pole terminals on said hand unit connector.

5. A sensitive machine tool feed rate indicator comprising, in combination, a pickup unit casing, anchoring means on the underside of said casing comprising a permanent magnet and a compressible friction element, resistor means mounted in said casing and having two ends and substantial effective length of uniform electrical resistance between said ends, a movable contact engaging said resistor means intermediate the ends thereof, an actuator coacting with said contact and projecting from said casing, a permanent actuating magnet attached to the projecting end of said actuator, direct current power supply means defining two power supply poles of opposite polarity, means for connecting said poles to said respective ends of said resistor means independently of said contact, a capacitor, a second resistor, means for connecting said capacitor and said second resistor in series between said movable contact and one of said poles, an electronic amplifier, means connecting said amplifier to opposite ends of said second resistor to be in parallel electrically with said second resistor and respond to the differential voltage thereacross, and a sensitive meter connected to the output side of said amplifier and graduated to indicate the effective output of the amplifier in terms of feeding speed.

6. A sensitive machine tool feed rate indicator comprising, in combination, resistor means having two ends and substantial effective length therebetween, a contact movably engaging said resistor means between said ends thereof, actuating means coacting with said contact to move the latter along said resistor means, means defining two power supply poles of opposite polarity, means for connecting said poles to said respective ends of said resistor means, a capacitor, means for connecting said capacitor between said contact and one of said poles and including first and second resistor connecting means and means for connecting said first and second resistor connecting means selectively in series with the capacitor to abruptly change the effective resistance in series with the capacitor, electronic amplifying means connected across the resistor connecting means in series with said capacitor, a sensitive meter connected to respond to the output of said amplifying means, and said meter having two indicating scales graduated respectively as a high speed scale and as a low speed scale corresponding to said respective resistor connecting means.

7. A compact lightweight hand instrument for determining the feeding rate of machine tools, comprising, in combination, a downwardly open upper casing section, a magnetic holder mounted in said upper casing section, a pickup unit casing, a permanent magnet on the underside of said pickup unit casing adapted to adhere magnetically to said holder to support said pickup unit casing releasably within said upper casing section, a compressible friction element on the lower side of said pickup unit casing adapted to have frictional engagement with said magnetic holder, resistor means mounted in said pickup unit casing and having two ends and substantially effective length between said ends, a contact movably engaging said resistor means, an actuator connected to said contact and projecting from said pickup unit casing, a lower casing section connected to said upper casing section to be supported thereby, said lower casing section being shaped and dimensioned to be supported in one hand of a user, an instrument panel detachably supported on said lower casing section, direct current power supply means supported on said instrument panel and defining two power poles, a capacitor supported on said instrument panel, means including a flexible cable for connecting said poles to said respective ends of said resistor means and for connecting said capacitor to said movable contact, a second resistor supported on said instrument panel, means for connecting said capacitor and said second resistor in series between said contact and one of said power poles and including said cable, an electrical amplifier supported on said instrument panel, means connecting opposite ends of the said second resistor to said amplifier to control the latter in accordance with the differential voltage across said second resistor, a meter mounted on said instrument panel and connected to the output of said amplifier, and said meter being graduated to respond to the output of said amplifier in terms of feeding speed.

8. A machine tool feed rate indicator comprising, in combination, a resistor having two effective ends and substantial effective length between said ends, said resistor having a uniform resistance along the effective length thereof between said ends, direct current power supply means providing two power supply poles of opposite polarity, means for connecting said power supply poles to said respective resistor ends, a movable contact engaging said resistor between said ends thereof, actuating means coacting with said contact and adapted for movement by a machine tool element to move the contact along said resistor between said ends thereof, a capacitor, a second resistor, means for connecting said second resistor and said capacitor in series between said movable contact and one of said power supply poles, two identical electronic amplifying elements, common power supply means connected to both amplifying elements to energize both elements equally, each amplifying element including a control terminal and an output terminal, means connecting opposite ends of said second resistor to said control terminals of the respective amplifying elements, and meter means connected between said output terminals of the two amplifying elements to accurately indicate the differential value of the outputs of the two elements in terms of machine tool feeding speed.

9. A sensitive machine tool feed rate indicator comprising, in combination, resistor means having substantial effective length and a uniform electrical resistance therealong, a contact movably engaging said resistor means, actuating means coacting with said contact and adapted for movement by a machine tool element to move said contact along the effective length of said resistor means, direct current voltage means having two output poles of opposite polarity connected to opposite ends of said resistor means independently of said contact, a capacitor, a second resistor, means for connecting said capacitor and said second resistor in series between said contact and one end of said resistor means, an electronic amplifier having an input side connected between opposite ends of said second resistor to be in parallel electrically with said second resistor and respond to the voltage thereacross, and sensitive indicating means calibrated in terms of machine tool feeding speed and connected to the output side of said amplifier to respond to the output of said amplifier.

10. Sensitive feed rate indicating apparatus comprising, in combination, a resistor of substantial length having two effective ends and a uniform resistance between said ends, direct current power supply means connected to said ends of said resistor to produce a uniform voltage drop along the length thereof, a contact engageable with said resistor, actuating means for moving said contact along said resistor, a capacitor, a second resistor, means for connecting said capacitor and said second resistor in series between said contact and one end of said resistor, means providing two power supply poles of opposite polarity, means connected to said power supply poles and forming two parallel circuit paths therebetween, each of said circuit paths including a primary impedance and a secondary impedance in series, the primary impedance of one of said circuit paths being formed by a voltage sensitive electronic amplifying device having a control connection to the capacitor end of said second resistor, and an electric meter connected between the secondary impedance end of the primary impedance of one of said circuit paths and the secondary impedance end of the primary impedance of the other circuit path.

11. A sensitive machine tool feed rate indicator comprising, in combination, a resistor having substantial effective length and a uniform electrical resistance therealong, a movable contact connecting with said resistor, actuating means coacting with said contact and adapted to move the latter along the effective length of said resistor, direct current power supply means connected to opposite ends of said resistor to produce a uniform voltage gradient along the effective length thereof, a capacitor, a second resistor, means for connecting said capacitor and said second resistor in series between said contact and one end of said first mentioned resistor, means defining two power supply poles of opposite polarity, means connected to said power supply poles and forming two parallel circuit paths therebetween, each of said circuit paths including a vacuum tube having a plurality of grids and connected in series with a secondary impedance, sensitive electric meter means calibrated in terms of machine tool feeding speed and connected between the secondary impedance side of the vacuum tube in one of said circuit paths and the secondary impedance side of the vacuum tube in the other circuit path, means connected to apply a zero calibrating voltage to one of said grids of each tube, means for adjusting relative to each other the calibrating voltages applied to the respective tubes to effect a zero calibration of said meter means, and means electrically connecting opposite ends of said second resistor to two grids in said respective tubes.

12. A sensitive feed rate indicator comprising, in combination, resistor means having two ends and a substantial effective length therebetween, a movable contact engaging said resistor between said ends thereof, direct current power supply means providing two power supply poles of opposite polarity, means for connecting said power supply poles to said respective ends of said resistor means, said resistor means having a uniform resistance along the length thereof, actuating means coacting with said contact and adapted to move said contact along said resistor means in response to movement of a machine tool element the speed of which is to be determined, a second resistor, means connecting said second resistor to one of said power supply poles, a capacitor, means for connecting said capacitor between said second resistor and said contact, an electronic amplifier, means connecting opposite ends of said second resistor to said amplifier to control the effective output of the latter in accordance with the voltage across said second resistor, a sensitive meter connected to the output side of said amplifier to indicate the electrical output of the amplifier in terms of speed, means for disconnecting said second resistor from said capacitor, means including a calibrating resistor selectively connectable between the other of said power supply poles and the capacitor end of said second resistor to produce a differential voltage across said second resistor simulating that resulting from capacitor current therethrough incident to a predetermined speed of movement of said contact along said resistor means during normal operation of the indicator, and a calibrating rheostat connected in series with one end of said resistor means to adjust the effective voltage applied thereto.

13. A sensitive feed rate indicator comprising, in combination, resistor means having two ends and substantial effective length therebetween, a movable contact engaging said resistor means between said ends thereof, externally operated actuating means for moving said contact along said resistor means, direct current power supply means forming two power supply poles of opposite polarity, means for connecting said poles to said respective resistor ends, said resistor means having a uniform resistance therealong, a capacitor connected to said contact, a second resistor connected to one of said poles; a selector switch having a zero calibrating position, a full scale calibrating position, and an indicating position; said selector switch including coacting contacts connected with said capacitor and with said second resistor, said coacting contacts being disposed in relation to each other to connect said capacitor in series with said second resistor when said selector switch is in said indicating position and to break the connection between said capacitor and said second resistor when said selector switch is in either of said calibrating positions thereof, a calibrating resistor connected to the other of said poles, said selector switch including coacting contacts connected to said calibrating resistor and to said second resistor and positioned in relation to each other to connect the calibrating resistor and said second resistor in series when said selector switch is in said full scale position and to break the connection between the two last mentioned resistors when said selector switch is in either said zero calibrating position or said indicating position, means defining two parallel circuit paths, means for applying a voltage across both circuit paths, each circuit path including a secondary impedance and a primary impedance connected in series, each primary impedance being formed by a vacuum tube having a plurality of grids therein, a sensitive meter connected between the secondary impedance sides of the vacuum tubes in said respective circuit paths, said meter being graduated to indicate current therethrough in terms of feeding speed, voltage supply means connected to apply a calibrating voltage to a grid of each of said tubes, said voltage supply means including means for varying relative to each other the calibrating voltages applied to the grids of said respective tubes to obtain a zero reading on said meter when said selector switch is in zero calibrating position, means electrically connecting opposite ends of said second resistor to two similar grids on said respective tubes, and voltage adjusting means connected in series with said power supply means to adjust the potential between said poles when said selector switch is in said full scale calibrating position.

References Cited in the file of this patent
UNITED STATES PATENTS

| | | |
|---|---|---|
| 2,177,569 | Jorgensen et al. | Oct. 24, 1939 |
| 2,332,773 | Barnette | Oct. 26, 1943 |
| 2,415,492 | Hines | Feb. 11, 1947 |
| 2,795,273 | Putnam | June 11, 1957 |